UNITED STATES PATENT OFFICE.

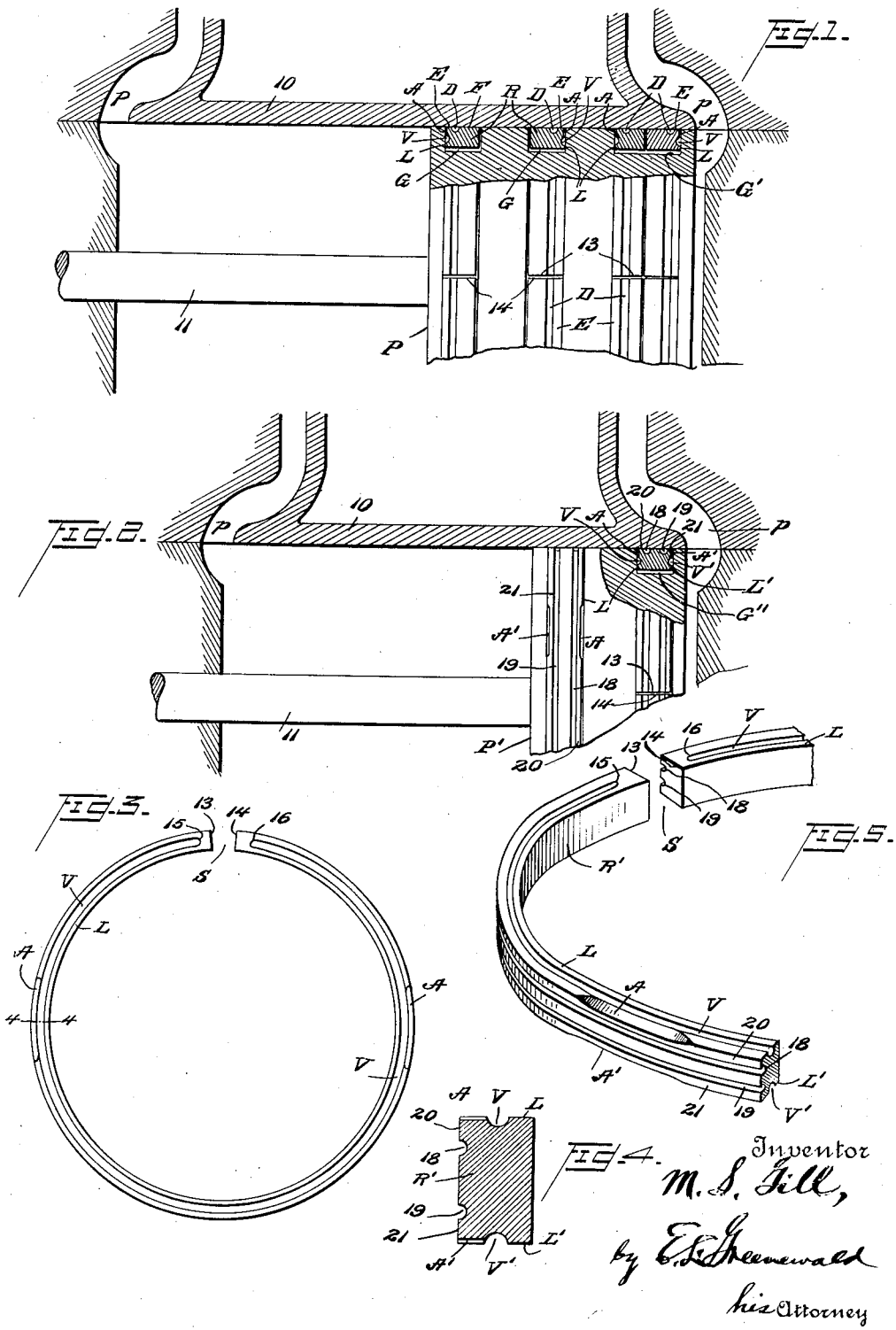

MIDDLETON S. GILL, OF SAN FRANCISCO, CALIFORNIA.

PISTON-RING.

1,385,613.  Specification of Letters Patent.  Patented July 26, 1921.

Application filed April 27, 1920. Serial No. 377,110.

*To all whom it may concern:*

Be it known that I, MIDDLETON S. GILL, a citizen of the United States, residing at San Francisco, in the county of San Francisco and State of California, have invented certain new and useful Improvements in Piston-Rings; and I do hereby declare the following to be a full, clear, and exact description of the invention, such as will enable others skilled in the art to which it appertains to make and use the same.

My invention relates to piston packing rings, and more particularly to means for preventing the leakage of motive or other fluid in either direction through the space between a cylinder and a piston working therein.

In engines, compressors, pumps and similar apparatus employing pistons carrying piston rings, it has heretofore been the usual practice to emphasize the importance of a leak-tight joint between the periphery of the piston ring and the inner wall or bore of the cylinder, but little attention has been given to the prevention of leakage of fluid past the joint between the piston ring and the piston or between the piston ring and the walls of the ring groove in the piston. Generally speaking, most piston rings on the market today are designed to snugly fit the groove in the piston and depend on both sides of the ring making sealing contact with the walls of the piston groove to thereby reduce the leakage between the piston and ring, but as the ring and the walls of the groove wear in use, the leakage increases. As a consequence there is a considerable loss of power and other disadvantages and undesirable results follow, as for example, in some engines there is an excessive leakage of oil past the piston ring and consequent undesirable deposit of carbon in the power or combustion chamber.

The primary object of the present invention is therefore to provide improved piston packing means for steam engines, gas engines, pumps, compressors, and other apparatus employing a cylinder having a reciprocating piston therein which alternately takes fluid pressure against the opposite ends thereof. More specifically, the object of the present invention is to provide an improved piston packing means adapted particularly for use in conjunction with counterflow steam engines and the like, whether single-acting or double-acting. In double-acting steam engines, pumps, compressors, and the like, the steam or other motive fluid or fluid that is impelled, alternately exerts pressure against opposite ends of the piston and there is consequently a liability of leakage of fluid from the chamber on one side of the piston past the piston ring to the chamber on the other side of the piston. It is also an object of the present invention to provide ring packing means which may fit loosely in a piston groove and will not only prevent leakage through the space between the packing means and the cylinder but which will also prevent leakage through the space between the packing means and the piston. In one embodiment of my invention I provide a single ring or a plurality of rings having surfaces which alternately make a fluid seal between the ring and walls of the piston groove or grooves as the pressure against the ends of the piston alternates. Another object of my invention is to provide a piston packing means that shall be applicable to una-flow steam engines and similar apparatus.

A further object of my invention is to provide an improved one-piece piston ring with which it shall be possible to attain the above described objects and desirable results.

The above and other objects and the novel features of my invention will be apparent from the following description taken in connection with the accompanying drawings, in which—

Figure 1 is a view illustrating so much of a cylinder and coöperating piston as is necessary to fully disclose my invention.

Fig. 2 is another view illustrating my invention.

Fig. 3 is a plan view of a piston ring embodying my invention.

Fig. 4 is an enlarged transverse sectional view of a piston ring embodying my invention, the section being taken on the line 4—4 of Fig. 3, and Fig. 5 is a perspective view of a portion of a piston ring embodying my invention.

Referring to Fig. 1 of the drawing, 10 designates so much of the cylinder of a steam engine, pump, compressor or similar apparatus as is necessary to the illustration of my invention. As here indicated, the engine is of the double-acting counterflow type being provided with inlet and exhaust ports $p$ at the opposite head ends thereof. The inlet and exhaust through the ports $p$ of the motive fluid or fluid to be impelled is controlled by suitable valve mechanism (not shown). It will be understood that the type of engine is merely illustrative of the application of the invention, and that the invention may equally well be applied to single-acting counterflow steam engines or to double-acting una-flow steam engines and the like. A piston P is mounted for reciprocation in the cylinder 10, and is provided with a suitable piston rod 11 rigidly or flexibly connected thereto. In the particular arrangement disclosed, the piston P alternately takes steam against opposite ends thereof, or, alternately, opposite ends thereof exert pressure against a fluid that is to be impelled by the piston.

In order to effectively prevent leakage of fluid, such as steam, in either direction through the space between the piston and cylinder bore, I have heretofore indicated that it is important to provide piston packing means that shall maintain a fluid-tight seal between the piston ring or packing means and the piston as well as between the former and the cylinder bore. Furthermore, in counter-flow steam engines it is advantageous to prevent leakage past the piston ring of the motive fluid and also of the exhaust steam, since in the first case there is a loss of power and in the second the walls and entering steam in the chamber on the opposite side of the piston will be cooled by exhaust steam leaking into it. This is particularly true of counterflow double-acting and una-flow double-acting engines.

Accordingly, in Figs. 1 and 2 I have illustrated how types of improved piston rings which are shown and described in my copending applications Serial Numbers 300,615 and 350,356, may be employed in carrying out my present invention to provide packing means for counterflow steam engines, for example.

As illustrated in Fig. 1, for example, the piston P may be provided with two circumferential packing ring receiving grooves G, G, each having substantially parallel side walls and being of substantially uniform cross-section circumferentially of the piston. Each groove G is a trifle deeper and wider than the piston packing ring R that it is adapted to receive.

The grooves G, as well as the piston rings R, are in all essential respects similar to those disclosed in my copending applications Serial Nos. 300,615 and 350,356, the rings R being substantially similar to those disclosed more fully in my application Serial No. 350,356. Fig. 3, with Fig. 1, will serve to disclose the construction of the rings R, each of which is a one-piece ring of resilient material, such as cast iron, and split transversely as at S to provide ends 13 and 14 having plane radial faces adapted to abut to form the joint of the ring. One edge face of each of the rings R is provided with a groove V that is disposed between the marginal edges of said edge face and extends longitudinally of said edge face, terminating adjacent to but short of the ends 13 and 14, as at 15 and 16. At diametrically opposite localities in the edge face of the ring and about 90° from each side of the split S, there are pressure relief ports or passages A which extend from the groove V outwardly to the outer periphery of the ring. Between the inner peripheral edge of the ring and the groove V there is a sealing surface L that engages the side wall of the piston groove G and coöperates with the latter to maintain a fluid-tight seal between the piston ring and piston during the operation of the piston and engine.

The outer periphery of the piston ring R contains a groove D that is located nearer to the edge face containing the groove V than to the other edge face, leaving a comparatively narrow sealing surface E between the groove D and such edge face, which sealing surface is sufficient to maintain an effective fluid-tight seal between the ring R and the cylinder bore. The bearing surface F between the other edge of the ring R and the groove D assists in guiding the ring, but is not essential as a sealing surface. The ends of the circumferential peripheral groove D open into the ends 13 and 14 at the split S and through the space between such ends communication is established between the groove D and the edge face of the ring opposite the face containing the groove V. The operation of this ring is in all respects the same as that of the ring disclosed in my application Serial No. 350,356.

As indicated in Fig. 1, a single ring R is placed in each of the grooves G, G, but in order to obtain effective action of the ring in opposite directions, in a double-acting engine for example, the grooved edges of the rings are positioned so as to face in opposite directions and toward walls of the ring-receiving groove in the piston away from the pressure, as illustrated. By this arrangement the fluid pressure against either end of the piston P will be kept from leaking past the piston rings R by the engagement of the sealing surfaces E and L thereof, respectively, with the cylinder bore and with the wall of the ring-receiving groove of the piston. The rings R, R will alternately be maintained in sealing relation so that the ring which makes the seal is the one having the edge groove thereof facing away from the pressure, and when the piston P reverses its direction of movement the other ring will make the seal between the surface L thereof and the wall of the ring-receiving groove in the piston, and the outward pressure of the sealing surfaces E against the cylinder bore due to the resiliency of the rings and fluid pressure behind the rings, will be sufficient to prevent leakage between the piston rings and the cylinder bore. Accordingly, the two rings R, R considered together and having the edge faces thereof carrying the sealing surfaces L facing in opposite directions, effectively prevent leakage past the piston in counterflow single-acting or double-acting engines and the like.

In Fig. 1 I have also illustrated an arrangement whereby the two rings R, R may be arranged in a single wide piston groove G'. The only difference between this arrangement and the one just described is that the ring groove G' is a trifle wider than sufficient to take two piston rings of the same construction as the rings R, R, or of equivalent construction. The operation of the double ring arrangement in the groove G', in which the sealing surfaces L, L are in edges that face in opposite directions, is in all respects similar to the operation previously described for the rings in the grooves G, G. The arrangement of two rings in a single groove G' provides a simpler construction, and in some respects is a more desirable arrangement. For the purpose of more clearly illustrating other parts in Fig. 1, the joints of the several rings are shown to be in line, but it will be understood that in practice such joints are intended to be staggered so that no two joints will be in line.

In Figs. 2, 3, 4 and 5, I have disclosed an improved type of one-piece piston ring which avoids the use of two separate rings illustrated in the equivalent piston packing means of Fig. 1. The piston P' shown in Fig. 2 is provided with one or more circumferentially extending ring-receiving grooves G'' which are of a size to receive a single piston ring R'. As illustrated in Fig. 3 the piston ring R' is split transversely at S, as heretofore described, forming ends 13 and 14, the faces of which are substantially in radial planes and are adapted to abut one against the other when in position in the groove G''. The parallel edge faces of the piston ring R' are provided with similar grooves V, V', as disclosed, such grooves terminating adjacent to but short of the ends 13 and 14 of the ring. The grooves V, V' are disposed within the marginal edges of the ring R' and leave sealing surfaces L, L' between them and the inner peripheral edge of the ring. These sealing surfaces L, L' are arranged so as to engage and maintain a seal between the opposite side walls of the groove G'' and the ring R', to prevent leakage of fluid in either direction between the piston and the piston ring.

The opposite edge faces of the ring R' are also provided with suitable passages to relieve any pressure that gathers in the grooves V, V', and which might tend to break the seal between the surfaces L, L', and the side walls of the piston ring receiving groove. The pressure relief passages A, A' herein disclosed correspond in all respects to those more fully described in my application Serial No. 350,356. Briefly, the passages A, A' are arranged about 90° in each direction from the split S and in each edge face of the ring R'. The passages A, A' extend for a substantial distance along the edge faces of the ring and may be formed therein in any suitable manner as by grinding off a small amount of the metal of the edges between the grooves V, V', and the outer peripheral edge of the ring so as to form elongated, comparatively shallow passages or relief ports which, at their ends, gradually taper down to the surfaces of the parallel end faces. The passages or channels A, A' extend from the grooves V, V', outwardly to the peripheral edge of the ring R', and because of their length and position in respect to the grooves V, V', will rapidly relieve any pressure in such grooves V, V' and are also less liable to become inoperative, as by becoming clogged.

The outer peripheral face of the ring R' may be suitably grooved to relieve some of the frictional pressure against the cylinder wall, but at the same time maintain the strength of the piston ring and a sufficient sealing surface on the outer periphery thereof to effectively prevent leakage of fluid in either direction between the piston ring and the cylinder. As herein illustrated two peripheral circumferential grooves 18 and 19 are provided, the grooves 18 and 19 being relatively nearer to the opposite parallel edge faces of the ring, but separated therefrom by circumferentially extending sealing surfaces 20 and 21 which are adapted to engage and maintain a seal between the piston ring and the cylinder wall.

The grooves 18 and 19 open into the space between the ends 13 and 14 of the piston ring and through this space communicate with the opposite sides of the ring R', since in operation the ends 13 and 14 do not necessarily abut against one another to such an extent as to entirely close this space. I have furthermore discovered that it is not essential to provide overlapping ends for the piston ring, as the leakage through the space between the ends 13 and 14 is of very little consequence. The joints formed by the abutting ends 13, 14, are however desirably staggered as indicated in the drawings, to more effectively prevent even such leakage as might pass the spaces between such ends.

It will be seen that by providing grooves in both edges of a single ring, I provide a ring that takes the place of two oppositely facing piston rings, and this single ring is therefore a more desirable packing means for most purposes, as in double-acting engines. In operation the ring R' prevents leakage of steam or other fluid in either direction through the space between the piston and the cylinder, in steam engines, gas engines, pumps and compressors, and is particularly applicable to the prevention of such leakage in steam engines of the counterflow type. However, my invention is in no sense limited to such uses, nor to the particular details herein described, as the principles of the invention may be applied in various ways without departing from the spirit of my invention and without sacrificing any of the advantages thereof.

What I claim is:

1. The combination with a piston grooved to receive piston packing means, of piston packing means carried by such piston and fitting the grooved portion thereof, such packing means comprising ring means grooved in the outer periphery thereof and also grooved in the oppositely facing edges thereof, such ring means also having channels extending from such grooves in the oppositely facing edges outwardly to the outer periphery of such ring means.

2. The combination with a piston grooved to receive piston packing means, of piston packing means carried by such piston and fitting such grooved portion thereof, said packing means comprising ring means having circumferentially extending grooves in the outer periphery thereof and grooves within the margins of the oppositely facing edges thereof and channels in such oppositely facing edges extending outwardly from the grooves in the latter to the outer periphery of such ring means.

3. The combination with a cylinder, of a piston working therein and taking fluid pressure against each end thereof, said piston being grooved to receive and carry piston packing means, packing means comprising ring means circumferentially grooved in the outer periphery thereof and also having grooves in the oppositely facing edges thereof and channels in such oppositely facing edges extending outwardly from the grooves in the latter to the outer periphery of such ring means.

4. The combination with a cylinder, of a piston working therein and taking fluid pressure against each end thereof, said piston having a packing ring receiving groove, and ring means disposed in said groove and circumferentially grooved in the outer periphery thereof, said ring means also having grooves within the marginal edges of the edge faces thereof which are disposed opposite the side walls of such ring-receiving groove in the piston and channels extending outwardly from said grooves in the edge faces to the outer periphery of said ring means.

5. The combination with a cylinder, of a piston working therein and taking fluid pressure against each end thereof, said piston having a packing ring receiving groove, a one-piece packing ring disposed in said groove and circumferentially grooved in the outer periphery thereof, said ring being transversely split at one place and having grooves in the edge faces thereof terminating adjacent to but short of such split place, and channels in such edge faces extending outwardly from said grooves in the edge faces to the outer periphery of such ring.

6. The combination with a cylinder, of a piston working therein and having provision for retaining ring packing means, and ring means carried by said piston and circumferentially grooved in the outer periphery thereof, said ring means being transversely split and having grooves in the edge faces thereof terminating adjacent to but short of such split portion or portions, and channels in such edge faces extending outwardly from such grooves in said edge faces to the outer periphery of said ring means.

7. The combination with a piston having one or more piston ring receiving grooves, of one or more piston rings disposed in such groove or grooves, such ring or rings being transversely split and circumferentially grooved across such split portion or portions, such ring or rings also having grooves in the oppositely facing edge faces thereof terminating adjacent to but short of such split portion or portions, and shallow channels extending from such grooves in said edge faces outwardly to the outer periphery of said ring or rings.

8. Piston packing means adapted to fit a ring-receiving groove in a piston and having a grooved outer peripheral face and also having longitudinally grooved edges facing in opposite directions and adapted to bear against the side walls of the ring-receiving groove of the piston and channels extending outwardly from such longitudinal grooves to the outer periphery of the packing means.

9. A piston packing ring having a grooved outer peripheral face and longitudinally grooved oppositely facing parallel edges, and channels in such edges extending outwardly from such longitudinal grooves to the outer periphery of the ring.

10. A one-piece piston packing ring suitably split to provide a joint whereby the ring may be expanded in applying and removing it, said ring having one or more grooves in its peripheral face opening into the space at said joint, longitudinal grooves in the oppositely facing edge faces of said ring terminating adjacent to but short of said joint, and channels in said edge faces leading outwardly from such longitudinal grooves to the outer periphery of said ring.

11. A one-piece piston packing ring split at one place to provide a joint having abutting ends which are disposed substantially in radial planes, circumferential grooves in the outer peripheral face of said ring and opening into the space at said joint, said ring having an outer peripheral cylinder-engaging sealing surface between said grooves and each edge face of the ring, said ring also having grooves in the parallel edge faces thereof and extending longitudinally of said edge faces within the margins thereof, such edge grooves terminating adjacent to but short of the ends of said ring at said joint, said ring having sealing surfaces between said edge grooves and the inner peripheral edge of the ring adapted to engage the walls of the ring-receiving groove of a piston, and shallow channels in said edge faces leading outwardly from said edge grooves to the outer peripheral edge of said ring.

In testimony whereof I hereunto affix my signature.

MIDDLETON S. GILL.

Witness:
J. W. CRUM.